US012782531B2

(12) United States Patent
Eliyahu

(10) Patent No.: US 12,782,531 B2
(45) Date of Patent: Nov. 3, 2026

(54) LASER TAPE MEASURE DEVICE

(71) Applicant: TOOLS PLATFORM LLC, Davie, FL (US)

(72) Inventor: Menachem Eliyahu, Davie, FL (US)

(73) Assignee: TOOLS PLATFORM LLC, Davie, FL (US)

( * ) Notice: Subject to any disclaimer, the term of this patent is extended or adjusted under 35 U.S.C. 154(b) by 395 days.

(21) Appl. No.: 18/340,801

(22) Filed: Jun. 23, 2023

(65) Prior Publication Data

US 2024/0426993 A1 Dec. 26, 2024

(51) Int. Cl.
*G01S 7/51* (2006.01)
*G01B 3/1005* (2020.01)
*G01S 17/08* (2006.01)

(52) U.S. Cl.
CPC .............. *G01S 7/51* (2013.01); *G01B 3/1005* (2013.01); *G01S 17/08* (2013.01); *G01B 2003/1023* (2013.01)

(58) Field of Classification Search
CPC ...... G01B 3/10; G01B 3/1005; G01B 3/1041; G01B 3/1043; G01B 3/1084; G01B 3/1085; G01B 3/1092; G01B 3/1094; G01B 11/02; G01B 11/026; G01B 2003/1023; G01B 3/10411; G01S 17/02; G01S 17/08; G01S 17/51; G01S 7/51
USPC .......... 33/755, 760, 761, 227, 762, 768, 769
See application file for complete search history.

(56) References Cited

U.S. PATENT DOCUMENTS 5,182,863 A * 2/1993 Rando .................... G01B 11/26 33/290
6,612,046 B1 * 9/2003 Cimorell .................. B25H 7/04 33/760
6,868,620 B2 * 3/2005 Sanoner ................... G01B 3/11 33/763
7,024,791 B2 * 4/2006 Marshall .............. G01B 3/1041 33/DIG. 21

(Continued)

FOREIGN PATENT DOCUMENTS

AU 2016427468 A1 * 5/2019 ........... G01B 3/1092
CN 105627857 A * 6/2016

(Continued)

OTHER PUBLICATIONS

Extended European Search Report in corresponding European Application No. 24181765.9 dated Dec. 12, 2024, 6 pages.

*Primary Examiner* — John E Breene
*Assistant Examiner* — Daniel M Quinn
(74) *Attorney, Agent, or Firm* — Leason Ellis LLP

(57) ABSTRACT

A laser tape measure device has a casing comprised of a first housing and a second housing. A laser ranging device is arranged toward and is attached to the first housing. An upper interior plate is arranged between the first housing and the second housing, and is attached to the second housing to form a chamber for the laser ranging device. A tapeline structure is arranged toward and fastened to the second housing and includes a tapeline wheel upon which a measuring tape is wound. A lower interior plate is attached to and covers only the bottom of the tapeline wheel and forms a lower part of a tapeline cavity. No portion of the upper interior plate extends into the tapeline cavity and no portion of the lower interior plate extends into an upper part of the tapeline cavity.

5 Claims, 6 Drawing Sheets

(56) References Cited

U.S. PATENT DOCUMENTS

| | | | | |
|---|---|---|---|---|
| 7,299,565 | B2 * | 11/2007 | Marshall | G01C 15/004 33/768 |
| 8,356,419 | B2 * | 1/2013 | Lord | G01D 7/00 33/763 |
| 8,863,399 | B2 * | 10/2014 | Steele | G01B 3/1003 33/679.1 |
| 9,046,340 | B2 * | 6/2015 | Li | G01S 17/88 |
| 10,634,476 | B1 * | 4/2020 | Bautista | G01C 15/004 |
| 11,143,494 | B2 * | 10/2021 | Li | G01B 3/10 |
| 11,680,784 | B2 * | 6/2023 | McKinster | G01B 3/1005 33/761 |
| 11,906,296 | B1 * | 2/2024 | Qu | G01S 17/88 |
| 2004/0040170 | A1 * | 3/2004 | Sanoner | G01B 3/11 33/762 |
| 2004/0221470 | A1 * | 11/2004 | Lin | G01B 3/1084 33/760 |
| 2004/0237326 | A1 * | 12/2004 | Wang | G01B 3/1084 33/760 |
| 2007/0227029 | A1 * | 10/2007 | Shute | G01B 3/1041 33/761 |
| 2012/0055038 | A1 * | 3/2012 | Lindsay | G01B 3/1061 33/761 |
| 2018/0164087 | A1 * | 6/2018 | Mrozinski | G01S 17/08 |
| 2021/0325159 | A1 * | 10/2021 | Baxter | G01B 3/1056 |

FOREIGN PATENT DOCUMENTS

| | | | | | |
|---|---|---|---|---|---|
| CN | 207020310 | U | | 2/2018 | |
| CN | 208269762 | U | * | 12/2018 | |
| CN | 208443280 | U | * | 1/2019 | |
| CN | 209371910 | U | * | 9/2021 | |
| CN | 218120787 | U | * | 12/2022 | |
| CN | 116294882 | A | * | 6/2023 | G01B 3/1092 |
| KR | 20080103494 | A | * | 11/2008 | G01B 11/026 |
| WO | WO-2018076178 | A1 | * | 5/2018 | G01B 3/1092 |
| WO | WO-2018232621 | A1 | * | 12/2018 | G01S 17/02 |
| WO | WO-2020160598 | A1 | * | 8/2020 | G01B 3/1061 |

* cited by examiner

LASER TAPE MEASURE DEVICE

FIELD OF THE INVENTION

The present invention relates to the field of distance measuring tools, and in particular to a distance measuring device that employs tape and laser measurement.

BACKGROUND OF THE INVENTION

Tapelines and laser ranging devices are common distance measuring tools. They have found applications in the fields of building construction, interior decoration, traffic accident disposition, and the like. In the prior art, when a tapeline is in used, the tape end part and the measuring terminal end of the tape need to be respectively level with the starting end and the terminal end of the object to be measured. The person making the measurement needs to use his/her hands or other auxiliary equipment to keep the tape on the object to be measured. In certain cases, an ordinary tapeline is inconvenient to operate and has lower measurement accuracy. For example, in the field of measurement at hazardous locations, the practicality of the ordinary tapeline is relatively poor.

In the field of building constructions, the tapeline is often used to measure the lateral length of an object at a high altitude or the vertical distance of an object above a ground reference point. Since there is no attachment point for the tapeline, the measurement can only rely on visual estimation at a distance of the start point or the terminal point to be measured. Therefore, the error of the measured value may be large and the measurement accuracy may be poor, which will adversely affect the construction work based on the measurement. If more accurate high altitude measurement data are desired beyond that which can be accomplished by using a tapeline, the measurer needs to build a supporting frame or climb high up using a ladder, so as to attach the tapeline to the object to be measured, in order to complete the measurement. If the object to be measured is very long, more than two workers are needed to climb high up to complete the measurement, which is operationally cumbersome and has a high labor costs while it is dangerous due to the risk of the measurement tool or workman falling from a great height.

In addition, due to the limit of the length of the tapeline, the applications in which it can be used are limited, so the measurement range is relatively limited to places having small spaces rather than large spaces. The ordinary tapeline usually has a measurement range of 5 meters, 7.5 meters or 10 meters. Some specially made tapelines may have a measurement range of up to 15 meters or 20 meters. However, the larger the measurement range of the tapeline, the larger the volume of the tapeline. Thus, long length tapelines are inconvenient for the workman to carry or use.

Although the laser ranging device of the prior art has higher measurement accuracy than a tapeline, it also has a larger volume and higher cost, and is inconvenient to carry and use. After being used over a long period, the light-emitting surface of the laser light source and the light-receiving surface of the light-sensitive device will experience relatively large abrasion, thereby affecting light ray feedback sensitivity and distance measuring accuracy. Moreover, the laser ranging device has larger errors in short-distance measurements, which greatly limits its use in some fields such as interior decoration. Further, it difficult to use in large-scale applications.

A potential solution to these problems is proposed in U.S. Pat. No. 11,143,494 which discloses a distance measuring device that combines a tapeline measurement device and a laser measuring device in a single case. The case is comprised of a first housing and a second housing with a third housing arranged between the first housing and the second housing. The third housing and the second housing together from a tapeline cavity where the edges of the third housing surround part of the cavity and extend into the second housing completely around the cavity. A measuring tape is provided inside the tapeline cavity.

A laser ranging device is arranged between the first housing and the third housing. The opposite side of the bottom wall of the third housing covers a further cavity were a laser ranging device is located. The laser ranging device includes a laser generating means for emitting measurement light beams to an object to be measured. At the object the light beams are reflected by the object so as to generate reflective light rays. A photoelectric conversion means captures all or part of the reflective light rays and converts them in to at least one feedback electric signal. A circuit board with a processor is connected to the laser generating means and the photoelectric conversion means. The processor acquires the feedback electric signal and calculates the distance from the object to be measured to the distance measuring device based on the time from when the light beam was sent to the object and when the reflected beam was received back from the object.

The third housing of U.S. Pat. No. 11,143,494 is difficult to manufacture because of its side walls that completely surround the tapeline cavity and extend into the second housing. Also, being one piece, it makes assembly of the device complicated. In particular, both the tapeline wheel and the laser ranging devices, which sit in the first and second housing, have to be completely assembled before the third housing can be installed between the other two housing and all three are fastened together.

SUMMARY OF THE INVENTION

According to the present invention a laser tape measurement device has both a tape measure in at tapeline cavity and a laser measuring device in an adjacent cavity. Thus, it is somewhat like that described in U.S. Pat. No. 11,143,494. However, unlike that design, it does not have a third housing with end walls that surround all of the tapeline cavity and also form part of an enclosure for the laser measuring device. In order to surround part of the tapeline cavity the third housing of the prior art is required to have side walls that are perpendicular to a vertical wall or bottom face. These side walls are received within the second housing in order to completely surround the tapeline cavity in conjunction with the second housing The laser tape measurement device of the present invention has left and right housings or shells. The interior of the device is divided into a laser ranging device on one side and a tapeline structure located in a cavity on the other side. A tapeline wheel with measuring tape wrapped about it is located in the tapeline cavity. A lower interior plate covers approximately the bottom third of the tapeline cavity. It has a side wall that extend only into and is fasten to the lower part of the right housing. There is an upper interior plate which has no end walls extending to the right housing. Instead, it has a flat surface facing the tapeline cavity and covering two-thirds of its height. The other side of the upper housing is fastened to the left housing which contains the laser ranging device.

Thus the present invention uses lower and upper housings instead of a single third housing. These housings are much similar in design than the prior third housing and thus are easier to mold. Further, because they attach to the tapeline and laser ranging portions respectively, the device is earlier to assemble.

BRIEF DESCRIPTION OF THE DRAWINGS

The foregoing and other objects and advantages of the present invention will become more apparent when considered in connection with the following detailed description and appended drawings in which like designations denote like elements in the various views, and wherein.

DETAILED DESCRIPTION OF THE INVENTION

Figure 1:
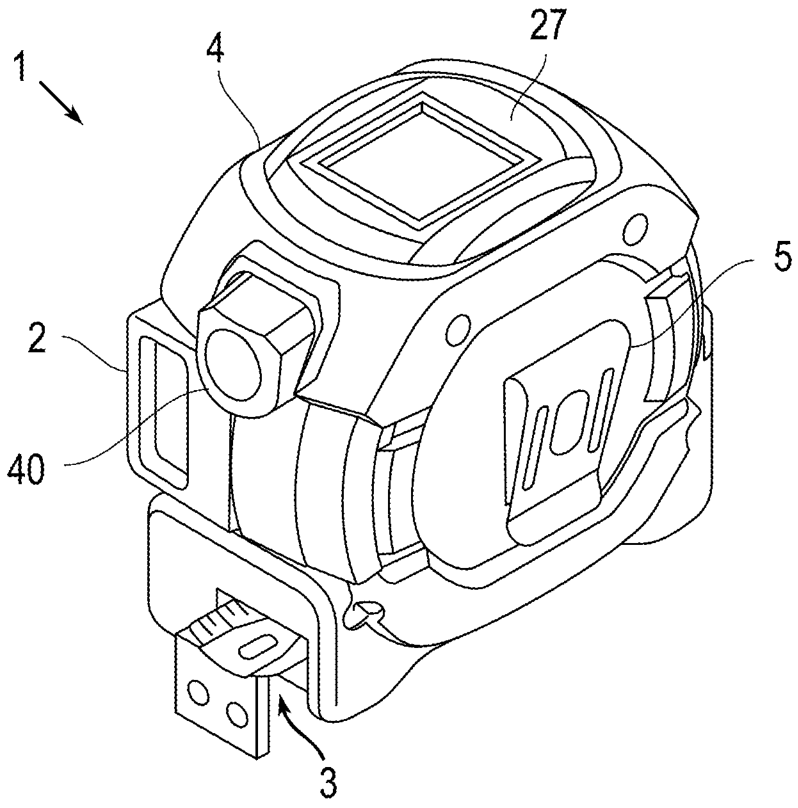
FIG. 1 is a front, right side, top perspective view of a laser tape measure device according to the present invention.
Figure 2:
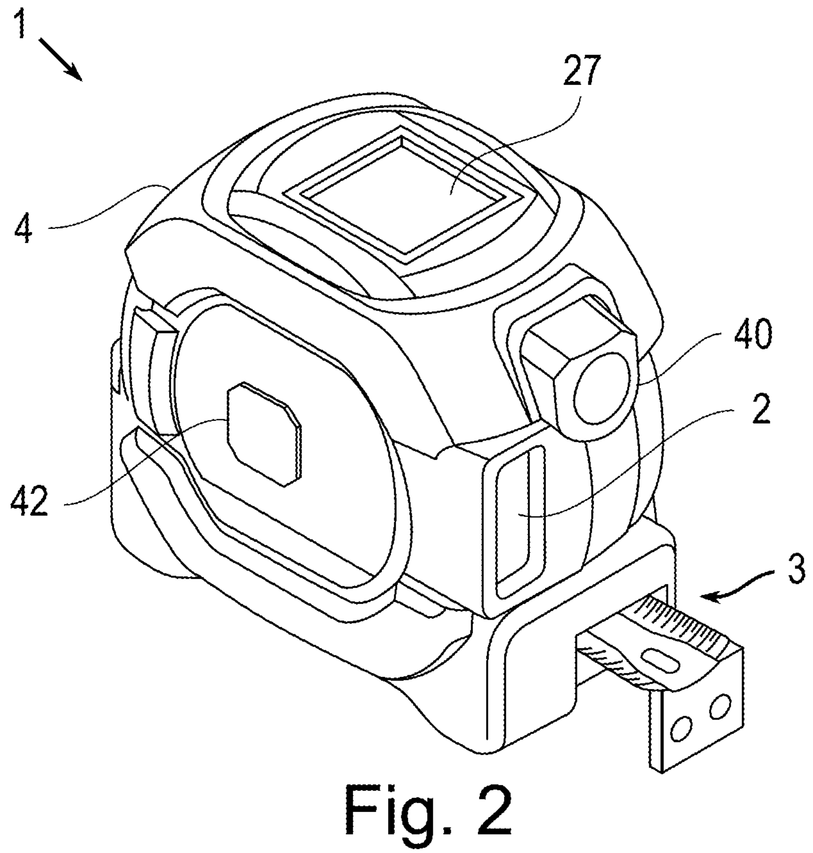
FIG. 2 is a front, left side, top perspective view of the laser tape measure device according to the present invention.
Figure 3:
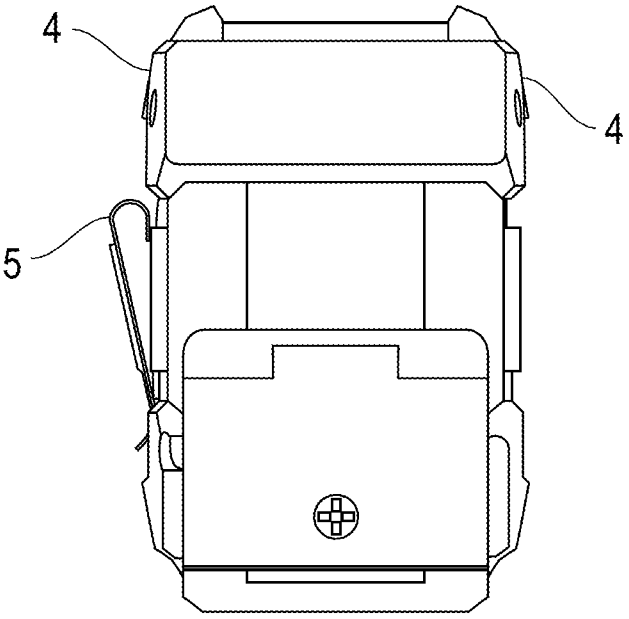
FIG. 3 is a rear elevation view of the laser tape measure device according to the present invention.
Figure 5:
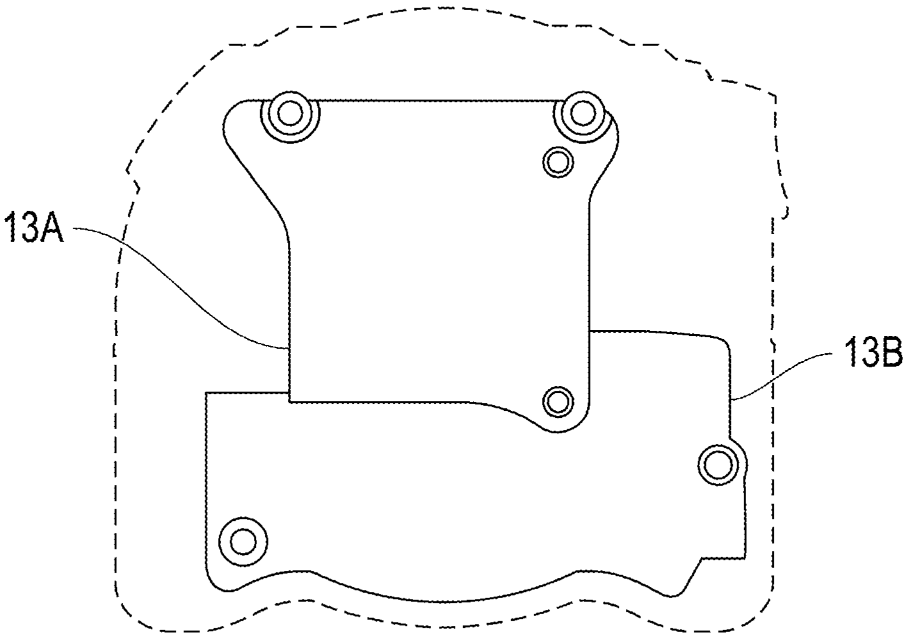
FIG. 5 is a view of the upper interior plate assembled above the lower interior plate and facing in the direction of the tapeline cavity (shown in shadow)

As shown in FIGS. 1-4, the laser tape measuring device of the present invention has an external casing 1 that includes a first shell or housing 11 and a second shell or housing 12. The device includes a laser ranging device 2 and a tapeline structure 3, a sheath 4 and a clip 5. Clip 5 is used to clip the distance measuring device on the waistband of the user, which is convenient to carry the device. Further, the device includes a viewing panel 27 through which the measurements from the laser ranging device can be viewed. The viewing panel is parallel to the bottom surface of the casing, i.e., it is horizonal and not as some angle. In addition, there is a tape retraction bottom 40 on the front that allows an extended tape to be withdrawn into the casing and a laser on/off switch on the left side of the device.

The first housing 11 includes a first housing bottom face 111 (FIG. 4B) and a first housing side wall 112. The second housing 12 includes a second housing bottom face 121 and a second housing side wall 122. The second housing side wall 122 is connected to the first housing side wall 112, together forming the side wall and bottom face of the casing 1.

Figure 4A:
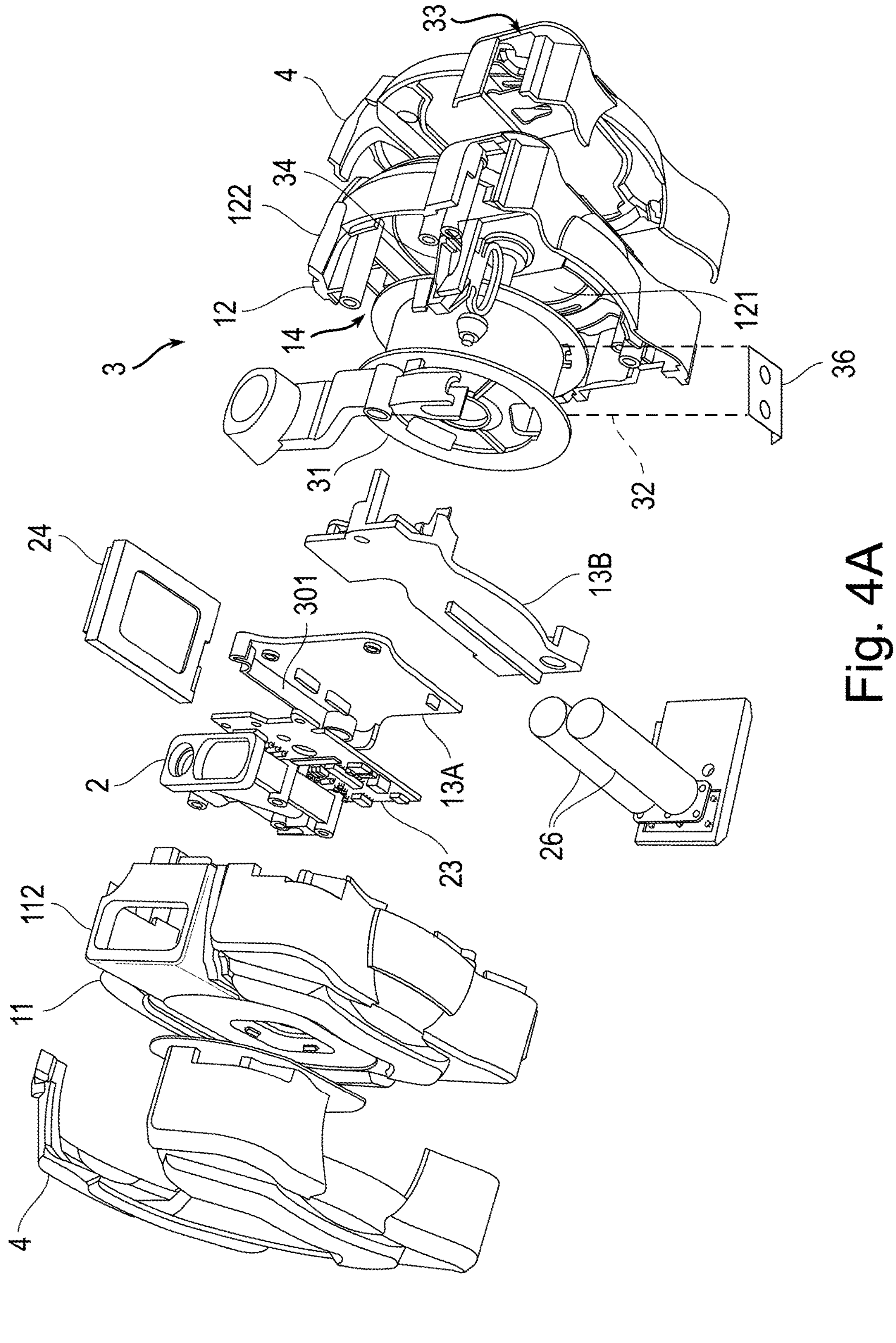
FIG. 4A is a front, left side, bottom exploded perspective view of laser tape measure according to the present invention
Figure 4B:
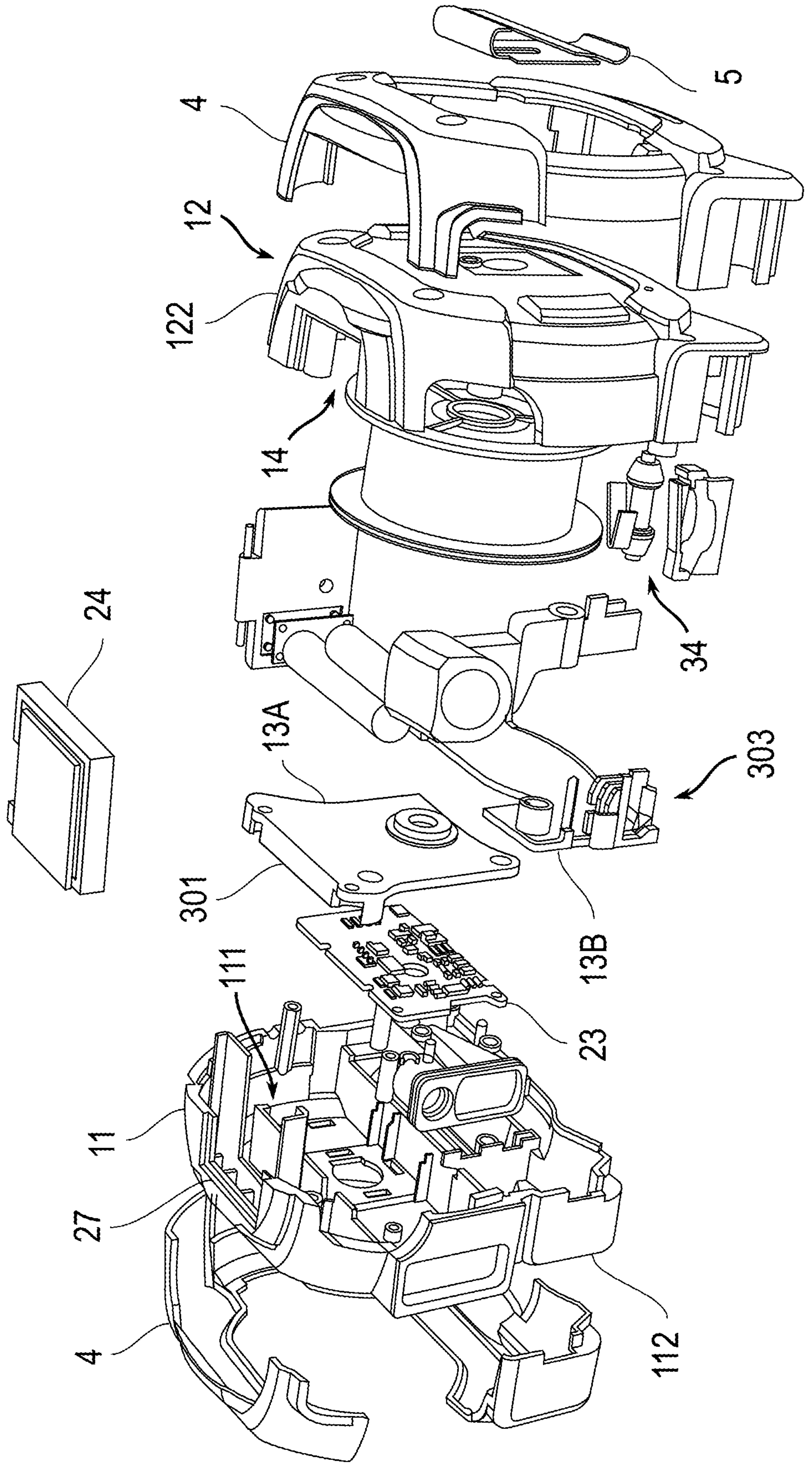
FIG. 4B is a front, right side, top exploded perspective view of laser tape measure device of the present invention.
Figure 6:
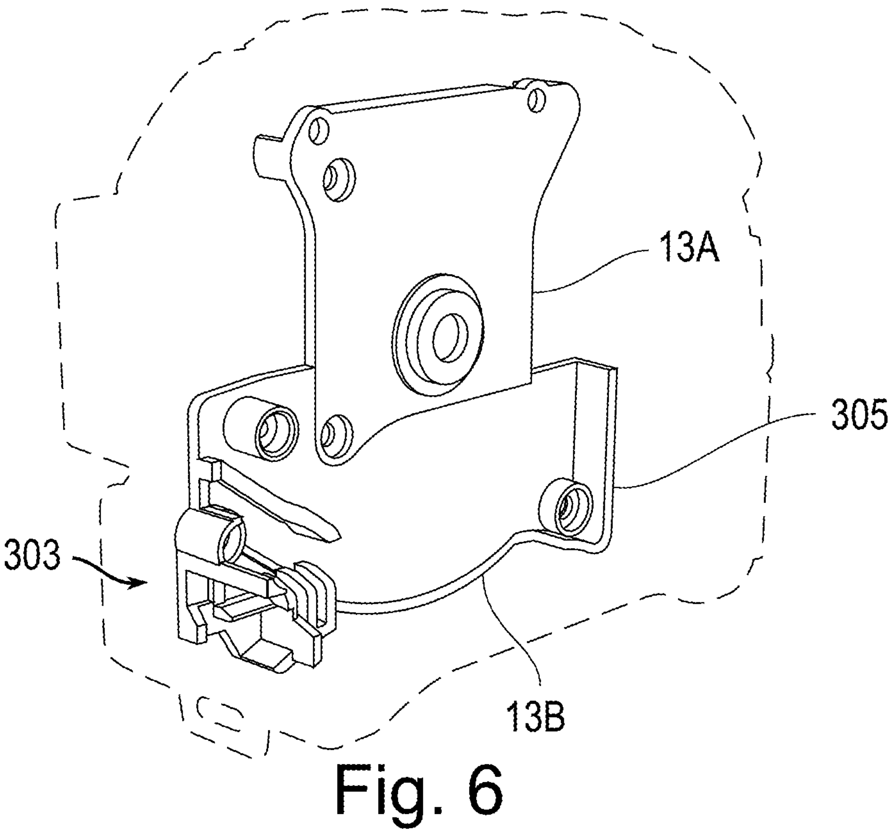
FIG. 6 is a front, right side perspective view of the lower interior plate assembled below the upper interior plate and facing in the direction away from the tapeline cavity and towards the laser ranging device (shown in shadow)

Within the casing 1 there is an upper interior plate 13A and a lower interior plate 13B that divide the interior into the laser ranging device 2 and the tapeline structure 3 as shown in FIGS. 4A & 4B. Within the tapeline structure there is a cavity 14 in which a tapeline wheel 31 is located. It can be seen that upper interior plate 13A has small side walls 301 along its top that project to the left toward the laser ranging device 2. Otherwise it has no significant side walls. The lower interior plate 13B has side walls primarily at the front 303 and back 305 that project toward the tapeline structure. See FIGS. 4B & 6. See FIG. 7. Thus it can be seen that while the upper interior plate 13A covers part of the tapeline cavity 14, it does not wrap around or enclose it because of the lack of side walls extending from it into cavity 14. The lower interior plate 13B has only partial side walls at the front, back that extend into cavity 14. However, they do so only so as to enclose the bottom third of tape wheel 31.

The device of the present invention may further include a sheath 4 which can be made of elastic material or soft material, partially or fully covering the first housing side wall 112 and the second housing side wall 122, and/or partially or fully covering the joint between the first housing bottom face 111 and the first housing side wall 112. The sheath 4 serves to enhance the feel of the device in the hand of the user, increasing the friction coefficient between the device and the user's hand, which helps to prevent the device from sliding out of the user's hand. Further, if the device slides out of the user's hand, the sheath has a certain cushioning effect, and increases the potential protection of the internal electronic devices and mechanical structures from breakage.

Figure 7:
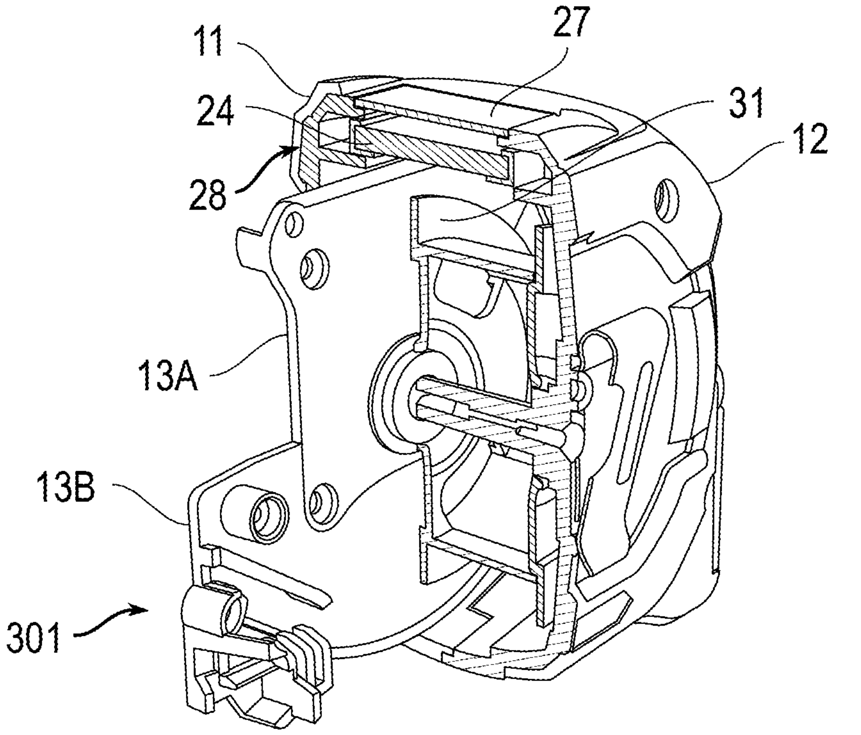
FIG. 7 is a partial lateral cross-sectional view of the tapeline cavity showing the installed upper and lower interior plates and the tapeline cavity with a tape wheel installed.
Figure 8A:
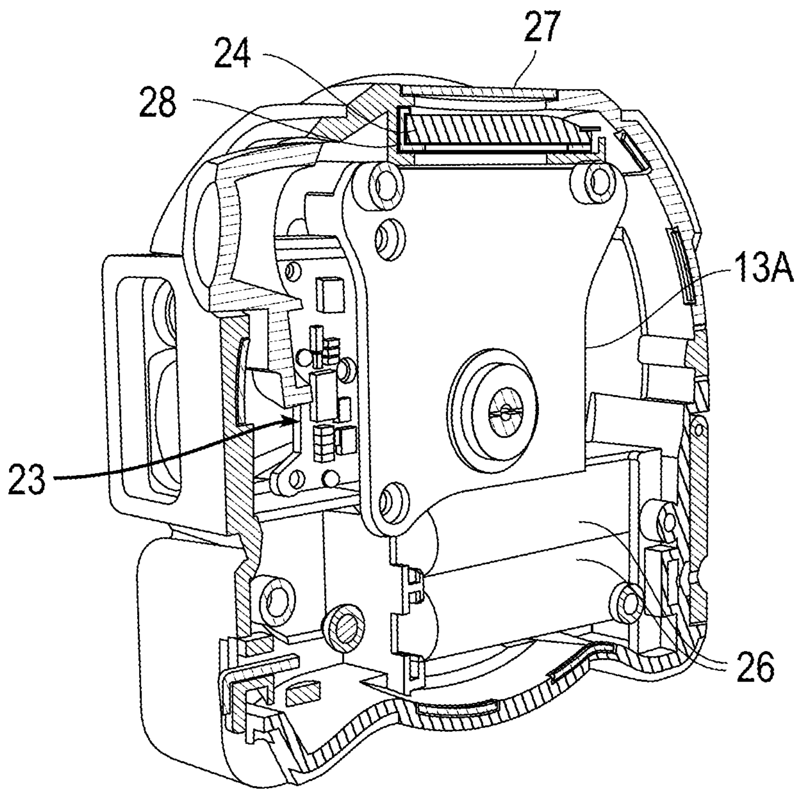
FIG. 8A is a longitudinal cross-sectional view of the laser measuring device showing the upper interior plate installed over the cavity for the laser ranging device and FIG. 8B shows the lower interior plate installed over the battery compartment
Figure 8B:
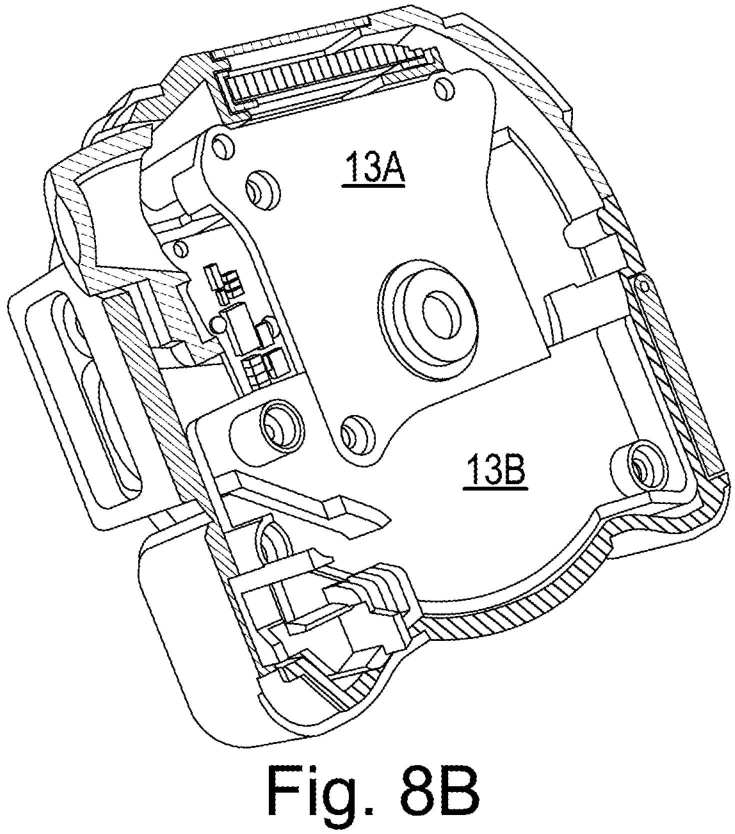

As shown in FIGS. 4A, 4B and 7, the tapeline structure 3 includes tapeline wheel 31, a tape 32 (shown in dotted line in FIG. 4A), a tape outlet 33 and a press block 34. The tapeline wheel 31 is rotatably mounted in the tapeline cavity 14 and the tape 32 is fully or partially wound onto the tapeline wheel 31, i.e., one end of the tape 32 is fixed to the tapeline wheel 31. A spring device (not shown) is mounted on the wheel and seeks to wind up the tape completely on the wheel so it is in an original position. The other end to the tape extends pass the press block 34 and through outlet 33 to a tapeline end portion 36. The press block forms a locking mechanism for locking a length of the tape extending out of the casing 1 through the tape outlet 33. A user can overcome the spring force of the wheel and the press block to withdraw the tape from the device while making a measurement.

When the tape 32 is pulled out of the housing 1, the press block 34 presses against the tape 32 due to an attached spring force, such that the length of the tape 32 outside the casing 1 is held constant against being drawn back into the casing by the spring force on the wheel 31 seeking to wind up the tape. While the tape remains stationary due to the press block it can be read by the user. When the tape retraction button 40 is pressed, the press block is lifted from the tape and it is wound back onto the wheel to restore it to its original position.

As is typical, and as explained in more detail in U.S. Pat. No. 11,143,404, which is incorporated herein by reference in its entirety, the laser ranging device 2 includes a laser beam generator, a photodetector, a circuit board 23 with a processor, a display means 24 and a power supply in the form of batteries 26. The laser beam generator and the photodetector can be arranged side by side, or one above the other, and they are integrally combined. In one embodiment the laser generator and photodetector are arranged next to each other and are both recessed in the first housing side wall 112.

The processor on circuit board 23 is connected to the laser generator and the photodetector, which acquires the feedback electrical signal. The processor uses the feedback signal from the photodetector to calculate the distance from an object to be measured to the distance measuring device. In particular, during operation, the processor issues a control signal to command the laser beam generator to emit laser beams toward the object to be measured. The measurement light beams are reflected from the surface of the object to be measured and generate reflective light rays. At least the reflected light rays parallel with the measurement light beams are captured by the photodetector and are converted into the electrical feedback signal that is provided to the processer. The processor has a timer to record a time point when the laser generator emits laser beams due to the user operating button 42 and a time point when the feedback electric signal is obtained. Based on the time difference between the two time points, the distance from the object to be measured to the distance measuring device can be calculated. During this period of time, the laser beam goes back and forth between the object to be measured and the distance measuring device at the light velocity. Half of the product of the time difference and the light velocity is the distance to be measured between the object to he measured and the distance measuring device.

As shown in FIGS. 1, 2, 4 and 7, the measuring device of the present invention further includes a display 24, a viewing panel 27 and a display mounting bracket 28. The viewing panel 27 is made of transparent material and arranged at the surface of the first housing 11 and/or the second housing 12, for protecting the display 24. The display mounting bracket 28 inwardly protrudes from the first housing bottom face 111 and the first housing side wall 112 and is arranged opposite to and parallel with the viewing panel 27. The display 24 is preferably a display screen connected to the processor for displaying the distance from the object to the distance measuring device.

The above are only specific implementations of the invention and are not intended to limit the scope of protection of the invention. Any modifications or substitutes apparent to those skilled in the art shall fall within the scope of protection of the invention. Therefore, the protected scope of the invention shall be subject to the scope of protection of the claims.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A laser tape measure device, comprising a casing comprised of a first housing and a second housing, each housing having upper and lower sections;

a laser ranging device arranged toward and attached to the upper section of the first housing;

an upper interior plate arranged between the upper sections of the first housing and the second housing, and being attached to the second housing to form a chamber for the laser ranging device;

a tapeline structure arranged toward and fastened to the second housing and including a tapeline wheel upon which a measuring tape is wound so the tape extends from the lower housing sections of the casing; and a lower interior plate attached to and covering only a bottom section of the second housing and forming a lower part of a tapeline cavity; and wherein no portion of the lower interior plate extends into the cavity for the laser ranging device, extends into an upper part of the tapeline cavity or forms a part of the upper part of the tapeline cavity.

2. The laser tape measure device of claim 1 further including a sheath covering at least a portion of the first and second housings, and wherein the sheath is made of elastic material or soft material.

3. The laser tape measure device of claim 1 wherein the first housing comprises a first housing bottom face in the bottom section of the first housing and a first housing side wall;

the second housing comprises a second housing bottom face in the bottom section of the second housing and a second housing side wall; and the second housing side wall and the first housing side wall are connected to each other, forming side walls of the casing.

4. The laser tape measure device of claim 1 further including:

a display means connected to a processor in the laser ranging device so as to display distance measuring information from the laser ranging device;

a display mounting bracket holding the display means parallel to the bottom housing sections of the casing between the first and second housings and towards an upper surface in the upper housing sections of the casing;

a viewing panel located in the upper surface of the casing parallel to the bottom of the casing, said viewing panel permitting a direct view of the display means.

5. The laser tape measure device of claim 4 wherein the viewing panel is recessed from the upper surface of the casing.

* * * * *